United States Patent [19]
Canning, Jr.

[11] 4,316,742
[45] Feb. 23, 1982

[54] COPPER REFINING

[75] Inventor: Everett J. Canning, Jr., Plainsboro, N.J.

[73] Assignee: Western Electric Co., Incorporated, New York, N.Y.

[21] Appl. No.: 198,515

[22] Filed: Oct. 20, 1980

[51] Int. Cl.³ .............................................. C22B 15/00
[52] U.S. Cl. ..................................... 75/76; 75/93 AD
[58] Field of Search ................................ 75/76, 93 AD

[56] References Cited

U.S. PATENT DOCUMENTS

| 603,200 | 4/1898 | Neumark | 75/76 X |
| 3,262,773 | 7/1966 | Fritze | 75/76 |
| 3,561,952 | 2/1971 | Greenberg | 75/76 |
| 4,038,068 | 7/1977 | Tyler et al. | 75/76 |

OTHER PUBLICATIONS

Stolarczyk et al., *Journal of the Institute of Metals*, vol. 86, pp. 49–58, 1957.

*Primary Examiner*—M. J. Andrews
*Attorney, Agent, or Firm*—J. F. Spivak

[57] ABSTRACT

Tin and antimony impurities can be removed from copper scrap by melting the scrap in the presence of a flux comprising a mixture of calcium and solution oxides in a weight ratio of calcium oxide to sodium oxide of from 1:1 to 4:1.

5 Claims, 2 Drawing Figures

TIN AND ANTIMONY REFINING
Ca-Na FLUX (3:1)

○ – TIN
△ – ANTIMONY

EFFECT OF CaO/Na$_2$O ON TIN AND ANTIMONY REFINING

△ – ANTIMONY OXIDE
○ – TIN OXIDE

COPPER REFINING

TECHNICAL FIELD

This invention relates to the flux refining of molten copper and more particularly the removal of tin and antimony impurities from copper by means of a basic oxide flux system.

BACKGROUND OF THE INVENTION

The recycling of copper from copper scrap has become more and more important due to the increased value of copper metal. A considerable quantity of copper scrap is available from the electrical cable industry. Typically, such scrap often contains lead, tin and antimony as major impurities in the scrap due to the various solder materials used in the fabrication of the cable. It is often extremely important to remove these impurities from the copper scrap before the copper can be used again.

Generally, the efficient removal of lead from the copper is accomplished in a separate step from the removal of impurities such as the tin and antimony. Typically, the tin and antimony content in copper should be reduced to below 50 ppm and 5 ppm respectively, and preferably to below 10 ppm or 3 ppm, respectively. One method used in the industry to remove tin from scrap copper is to charge a furnace which contains copper having a large tin contamination, for example, 0.3% tin or more, melting the copper to be refined and blowing oxygen into the copper to an oxygen percentage of about 1% and then treating the molten copper with silica sand. After this treatment, the copper bath is poled to remove practically all of the oxygen. The melt is then treated with a few tenths of a percent of soda ash. The bath is then cleaned, reoxidized to about 1% oxygen and again treated repeatably with silica sand until the tin content is reduced to the required limits. Alternatively, one can make additions of sodium carbonate and sodium nitrate to the bath under high oxygen conditions. This purification technique generally takes approximately two days and results in a copper loss to the slag of between 5 and 10 percent. In a paper reported in the *Journal of the Institute of Metals*, 86, 59–64, (1957-58) J. E. Stolarczyk et al. reported several fluxes useful for the removal of tin from copper. These fluxes included 50/50 mixtures of $Cu_2O$ and $Na_2Co_3$, $Fe_2O_3$ and $SiO_2$ a 30/70 mixture of CaO and $Na_2Co_3$, a 30/35/35 weight percent mixture of CaO, FeO and $SiO_2$ and a 60/20/20 weight percent mixture of $Cu_2O$, CaO and $Al_2O_3$. In U.S. Pat. No. 3,561,952 there is taught the use of alkali oxide-silicate slags as well as alkali oxide phosphates and/or borates for the removal of lead and tin from copper scrap. In U.S. Pat. No. 3,262,773 a dry refining process for the removal of arsenic, antimony, tin and other acidic oxide forming elements from molten copper is presented by combining the acid oxides of such elements with basic materials such as alkaline earth oxides, in particular calcium fluoride and calcium oxide in the slag. This patent suggests the use of slags having a final composition containing from 35 to 45 weight percent lime and wherein the slag is subjected to oxidizing treatment before the addition thereto of calcium oxide or calcium oxide precursers. The initial slag content in accordance with the teachings of this patent comprise 4 to 12 weight percent calcium oxide based upon the weight of the copper to be refined together with fluorspar (calcium fluoride) so as to form a slag phase having an excess of calcium oxide, oxidizing the copper to at least 1% oxygen content and contacting the slag phase with the molten crude copper so as to remove the impurities from the copper.

While the above methods have been reported and are available for the removal of these impurities from molten copper scrap, further improvements are desirable.

SUMMARY OF THE INVENTION

Tin and antimony impurities can be removed from copper scrap by melting the scrap in the present of a flux comprising a mixture of calcium and sodium oxides so as to produce a slag having a weight ratio of calcium oxide to sodium oxide of from 1:1 to 4:1.

DETAILED DESCRIPTION OF THE DRAWINGS

The ability of a flux or slag produced therefrom to remove impurities from a copper melt in a refining process can be measured by the distribution coefficient of the impurity. The distribution coefficient is the ratio, at equilibrium, of the weight percent of impurity found in the slag as compared to the weight percent of impurity found in the copper melt. Another way to determine the degree of refining achieved from a melt having a given quantity of impurites is simply to determine the amount of impurity in the slag skimmed from the melt subsequent to refining. This measurement assumes that the slag initially contained no or little of the same impurity.

The general method for removing impurities by means of the addition of a flux which forms a slag on a molten metal to be purified is well known in the art. Typically, in the case of copper, the copper scrap to be purified is melted in a refining furnace to a temperature in a range of about 1120° to 1150° C. and oxygen is added to the melt to increase the oxygen content thereof. The desired slag components are then added to the molten metal so as to form a molten slag composition thereon. The material is agitated and the impurities distribute themselves between slag and the molten metal to be purified in accordance with the distribution coefficient of the impurity. Generally, oxygen is added to the molten metal, $Cu_2O$ is thereby formed at least a portion of which enters the slag and is finally removed with the slag after the refining process is terminated. The slag may be separated from the molten copper by a skimming operation.

I have discovered that for the removal of antimony and tin impurities from copper scrap, a slag which comprises calcium oxide and sodium oxide in a weight ratio of from 1:1 to 4:1 gives superior results. The most preferred ratio of calcium oxide to sodium oxide in the final slag composition is from about 1.5:1 to 2.5:1. These ratios are based upon my unexpected discovery that there is a peak in the distribution coefficient for the separation of both antimony and tin from copper melts by means of a calcium oxide/sodium oxide slag. Typical, oxygen levels for the copper bath are from 0.2 to 0.8 weight percent. An oxygen level of from about 0.3 to 0.5 appears to be preferred.

Figure 1:
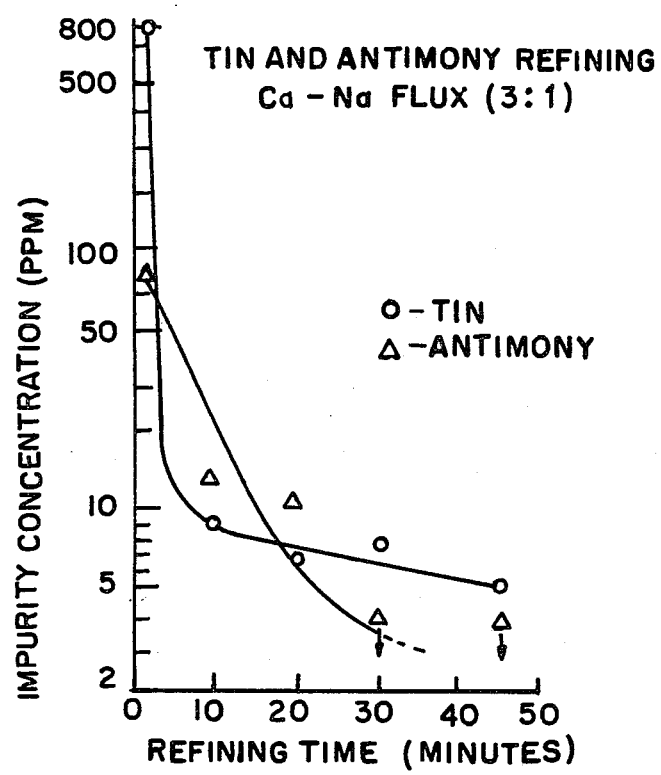
FIG. 1 is a graph showing the reduction of tin and antimony impurities in copper as a function of time while employing a novel flux composition for the removal of the impurities.

Referring to FIG. 1 there is shown a graph which indicates the ability of the novel calcium oxide/sodium oxide system to reduce the tin and antimony impurity concentrations in a melt formed from a copper scrap. The graph represents results employing a calcium oxide/sodium oxide flux having a weight ratio of 3:1 wherein the oxygen content of the molten copper is brought to about 0.7 weight percent. The weight of flux was about 2% of the weight of the copper bath. Under these circumstances, the final flux or slag attains a $Cu_2O$ concentration equivalent to about 59 weight percent of the slag. The calcium oxide and sodium oxide may be initially added in the form the oxides or as precursors such as calcium carbonate and sodium carbonate which decompose to form the oxides. As can be seen from the graph, the tin impurity level in the copper was initially approximately 800 parts per million while that of the antimony was initially about 80 parts per million. In the case of tin, after a refining time of only about 10 minutes, the tin level in the copper was reduced to about 9 parts per million and after approximately 30 minutes, the antimony level was reduced to about 5 parts per million.

Figure 2:
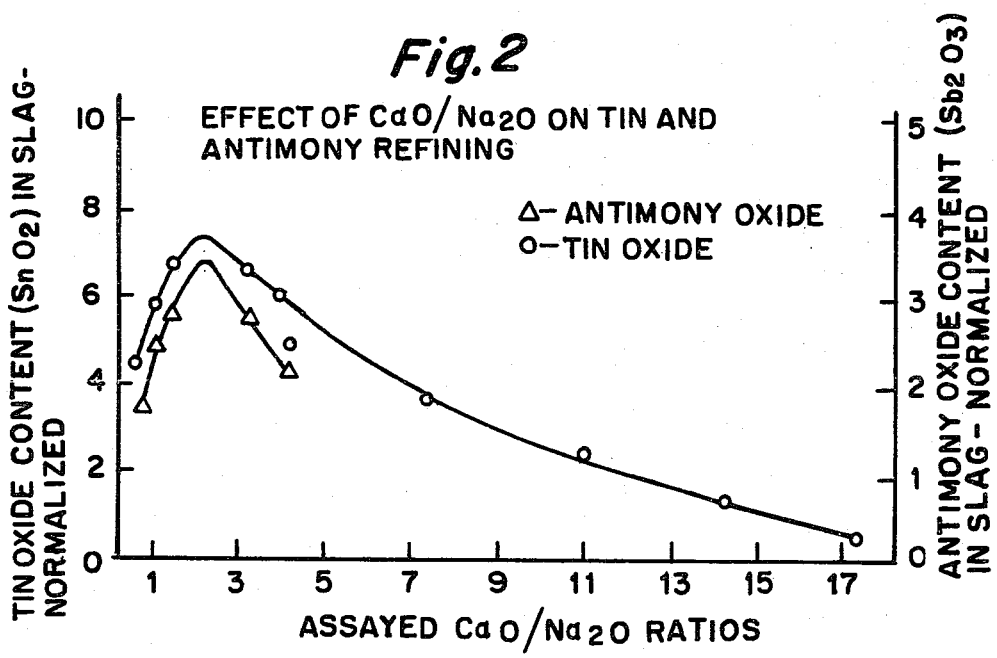
FIG. 2 is a graph showing the amount of tin and antimony as their oxides present in the slag subsequent to refining a starting material having a given tin and antimony impurity concentration, as a function of the calcium oxide to sodium oxide ratios of the slag used for refining.

Referring to FIG. 2, there is shown a graph which plots the tin oxide content ($SnO_2$) in the slag based upon normalized values (as opposed to actual numerical values) as a function of the assayed calcium oxide/sodium oxide weight ratio in the final slag. These experiments were preformed with an oxygen content of the copper melt of from 0.6 to 0.8 weight percent giving a copper oxide content in the slag of about from 55 to 65 weight percent. Refining time in all cases was two hours. The weight of the flux employed was 1.7 percent of the weight of the copper bath. As can readily be seen from this curve, there is a peak in the normalized value of impurity found in the slag in the vicinity of a calcium oxide to sodium oxide ratio of approximately 2, for both antimony and tin impurities. As can also be seen from this curve, the most effective calcium oxide to sodium oxide ratios are from approximately 1:1 to 4:1 while the most preferred range is approximately 1.5:1 to 2.5:1. The distribution coefficient of the two impurities exhibit essentially the same peak values. There is a slight difference in peak values of these curves if one plots the initial ratio of calcium oxide to sodium oxide as compared to the ratio in the final slag composition.

It may be noted that the addition of $Fe_2O_3$ to the flux decreased its effectiveness.

What is claimed is:

1. A method of refining copper comprising the step of treating an oxygenated molten copper bath with a flux which will produce a slag having a slag content comprising calcium oxide and sodium oxide in a weight ratio of $CaO/Na_2O$ of from 1:1 to 4:1 while bubbling oxygen into the copper bath.

2. The method of refining copper recited in claim 1 wherein the weight ratio of calcium oxide to sodium oxide in the slag is from 1.5:1 to 2.5:1.

3. The method of refining copper as recited in claims 1 or 2 wherein the oxygen content of the bath is from 0.2 to 0.85 weight percent oxygen.

4. The method recited in claims 1 or 2 wherein the oxygen content of the bath is from 0.3 to 0.5 weight percent oxygen.

5. The method recited in claim 1 including the step of separating the slag from the molten copper bath.

* * * * *